A. L. McGREGOR.
AUTOMOBILE BUMPER.
APPLICATION FILED OCT. 13, 1917.
1,300,434.
Patented Apr. 15, 1919.
2 SHEETS—SHEET 1.
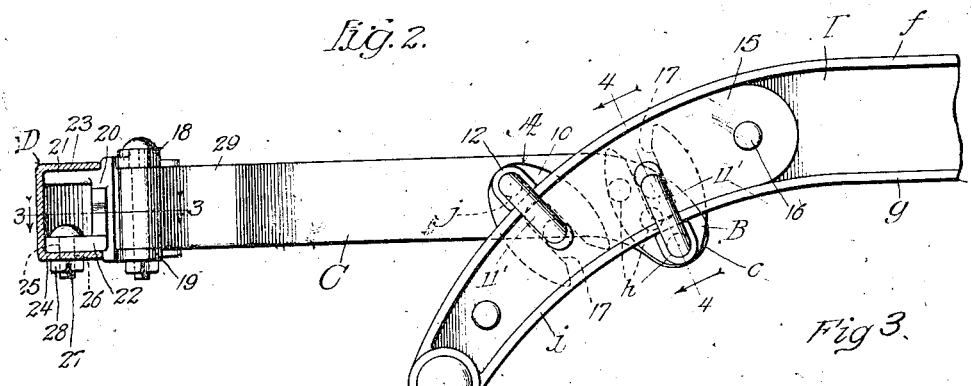
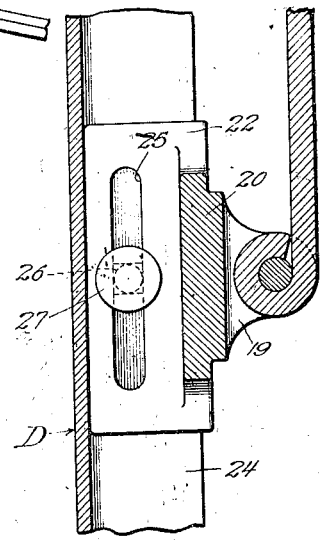
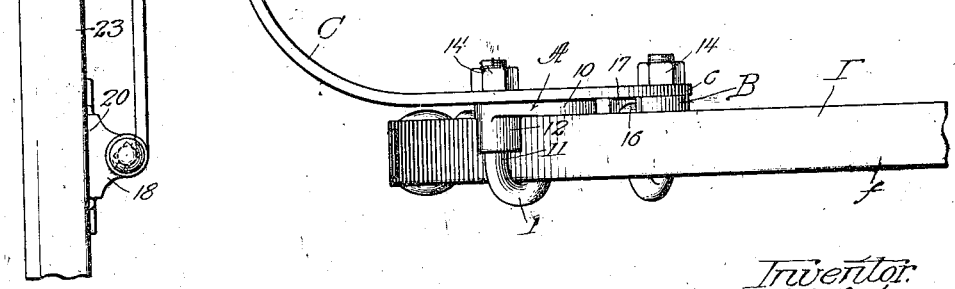
Witnesses:
Robert F. Weir
Arthur W. Casby
Inventor:
Allan L. McGregor
James R. Offield Atty.

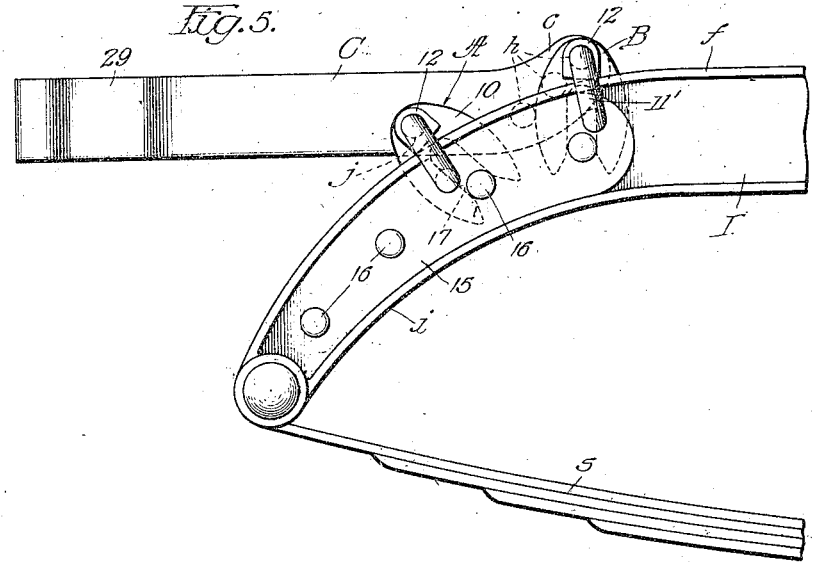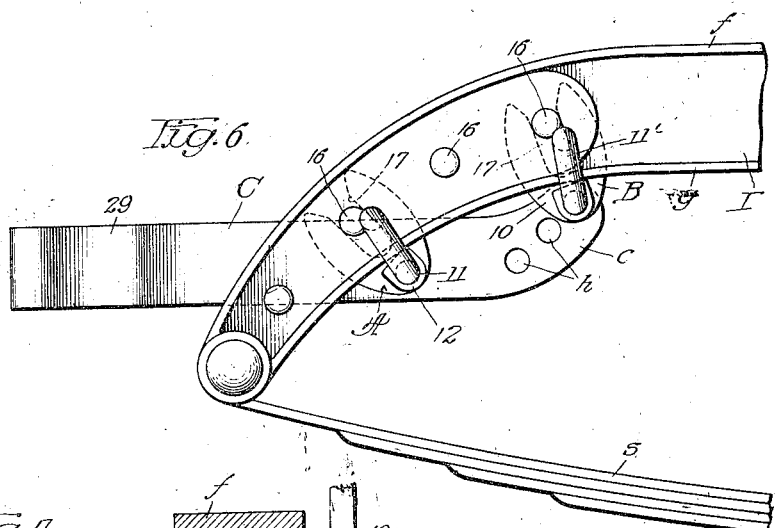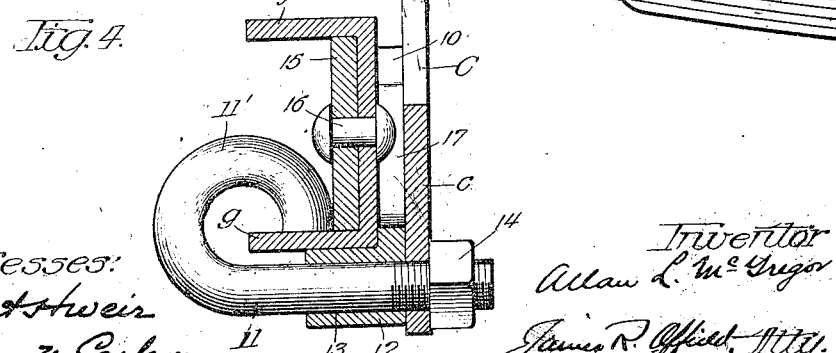

UNITED STATES PATENT OFFICE.

ALLAN L. McGREGOR, OF CHICAGO, ILLINOIS.

AUTOMOBILE-BUMPER.

1,300,434.         Specification of Letters Patent.         Patented Apr. 15, 1919.

Application filed October 13, 1917. Serial No. 196,539.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

My invention relates to automobile bumpers, particularly to improved construction and arrangement for fastening bumper bars to the body frames of automobiles.

The object of the invention is to provide such simple construction and arrangement that mechanical skill will not be necessary to fasten and adjust the bumper to the machine frame. This will enable purchasers to quickly and readily attach and adjust bumpers to their cars in the desired position.

The details of my invention will be readily understood by reference to the accompanying drawings in which—

Figure 1 is a plan view of one side of a bumper structure and the front end of a chassis side beam to which the bumper is secured, Fig. 2 is a side elevational view of the parts shown in Fig. 1, Fig. 3 is an enlarged sectional view on plane 3—3, Fig. 2, Fig. 4 is an enlarged sectional view on plane 4—4, Fig. 2, Fig. 5 is a side elevational view showing a modified attachment arrangement, and Fig. 6 is a side elevational view showing another modified attachment arrangement.

I employ two fittings A and B for securing each supporting arm C of the bumper structure to the side beam I of the vehicle chassis. The side beams shown are channel bars having their front ends *i* deflected downwardly to be pivoted to the elliptic springs *s*, the flanges *f* and *g* of each beam extending laterally inwardly. Each of the fittings A and B comprises an elliptic plate member 10 and a hook bolt 11. From one end of the plate an abutment lug 12 extends laterally and this lug has the opening 13 therethrough for receiving the shank of the hook bolt, the outer end of the shank being threaded to receive a nut 14. The inner ends *c* of the supporting arms C of the bumper structure are curved so as to be at an angle, and are provided with a row of holes *h* through which the shanks of the hook bolts may pass. In advance of the curved end *c* each arm C has a hole *j*, likewise for receiving the shank of a hook bolt. To fasten the supporting arm C to the side beam I, a hook bolt is passed through the hole 13 of a plate member 10 and through the hole *j* of a supporting arm, the hook 11' of the bolt passing around one of the beam flanges and with its end against the inner side of such flange. Another hook bolt is passed through another plate member 10 and through one of the holes *h* in the curved end of the supporting arm with its hook 11' extending around the flange of the beam with its end against the inner side of such flange. The abutment lugs 12 on the plate members 10 then engage against the outer sides of the respective flanges and when the nuts 14 are drawn tight the supporting arm C will be firmly clamped to the chassis beam against vertical or longitudinal displacement. The plate members may be arranged in a variety of ways to support the bumper structures in various horizontal planes or in various positions along the front ends *i* of the chassis beams. In Figs. 1 and 2 the members A and B extend in opposite directions, their lugs 12 engaging with the outer sides of the flanges *f* and *g* respectively, while the ends of the hooks 11' of the bolts abut against the inner sides of these flanges and against the web of the beam, the bumper structure being supported in horizontal position. Usually the curved ends *i* of the chassis side beams are reinforced by plates 15 which are secured against the inner side of the beam web by rivets 16. In order to accommodate these rivets the plate 10 of each fitting has a longitudinally extending slot 17 for receiving the rivet heads at the outsides of the beams. Such engagement of the plates with the rivets also assists in strengthening the connection of the bumper structure to the beams. The front ends of the chassis beams oftentimes serve to support drip pans or other vehicle parts but with my improved construction and arrangement these parts can readily be avoided in securing the bumper structure to the beams. In Fig. 5 is shown an arrangement which could be adopted where the lower parts of the beams are utilized for the support of the drip pan or other parts. Here the plate members A and B both extend downwardly with their lugs 12 engaging with the top of the upper flange *f* and the ends of the bolt hooks engaging with the under sides of this flange, the ends c of the arms C extending upwardly, and the outer hole h therethrough being utilized for the hook bolt. The plate members are also deflected so that their slots 17 receive the outer heads of the two inner rivets. With this manner of attachment the bumper structure is substantially in horizontal alinement with the tops of the beams I.

In Fig. 6 the attachment members are directed upwardly, the abutments engaging with the under side of the lower flange g and the ends of the bolt hooks engaging against the inner side of this flange, the notches 17 receiving the head of the second and fourth rivets, the bumper structure being in a horizontal plane a distance below the body of the beams I. Thus by a variety of arrangements of the attachment members a bumper structure can be secured in any desired horizontal position from the curved ends of the beams I, and by using different holes h in the ends of the supporting arm C the bumper structure can be adapted to be inclined from the horizontal, and drip pans or other frame parts can readily be avoided.

Where the flanges of the beams I are short the bends of the bolt hooks will not engage with the flange ends and when the nuts are drawn up tight the beam webs will be securely clamped between the hook ends and the plates 10.

As the distances between the side beams of different makes of automobiles sometimes varies I provide improved means for adjustment between the supporting arms C and the bumper structure bar D. As shown in Figs. 1, 2, and 3, the front end of each bar C is pivoted between the upper and lower lugs 18 and 19 extending from the block 20 whose forwardly extending upper and lower plates 21 and 22 extend into and engage with the upper and lower flanges 23 and 24 of the bumper bar D of U-shaped cross section. The lower plate 22 of each fitting has the longitudinal slot 25 for receiving a bolt which also extends through a hole 27 provided in the lower flange of the bumper bar. With this arrangement the distance between supporting arms C can readily be adjusted to be in accord with the distance between the beams I of the car to which the bumper structure is to be attached. By merely loosening the nuts 28 of the bolts 26 the supporting blocks 20 can readily be shifted longitudinally along the bumper bar until the proper distance is obtained, and then the nuts are again tightened and the bumper structure will fit the machine frame. In the bumper structure shown I provide resiliency and shock absorbing construction by providing a laterally extending loop 29 in each supporting arm C.

I thus provide such simple and convenient attachment mechanism and arrangement that skilled labor is unnecessary and the purchaser can readily and accurately fit and secure the bumper structure to his car in any desired position without the use of special tools.

I do not, of course, desire to be limited to the exact construction and arrangement shown and referred to as modifications could no doubt be made both in construction and arrangement which would still come within the scope of my invention. I claim as follows:

1. A clamp for securing arms of a bumper structure to the side beams of a vehicle comprising a U-shaped plate for engaging with its legs against the outside of a beam and having a lug extending laterally from its base for engaging with the outer side of a flange of the beam, a bolt passing through said lug and having its inner end curved to extend around the beam flange, and a nut for the outer end of said bolt, the space between the plate legs serving to receive rivet heads or other projections which might be on the outer side of the beam.

2. The combination with the curved front end of flanged side beams of a vehicle and strengthening plates secured thereto by rivets, of a bumper structure having rearwardly extending supporting arms provided with a plurality of bolt holes at their inner ends, a set of clamps for securing each arm to one of said side beams, each clamp comprising a plate and a bolt, said plates being adapted to engage against the outer sides of the respective beams and each plate having a lug at one end for abutting against the outer side of a flange of the beam, said bolts passing through said lugs and through the registering holes of the supporting arms, the inner end of each bolt being curved to bridge the respective flange, and nuts for the outer ends of said bolts, said plates having longitudinally extending slots for receiving the rivet heads at the outsides of the vehicle beams.

In witness whereof, I hereunto subscribe my name this 9th day of October, A. D., 1917.

ALLAN L. McGREGOR.